(12) United States Patent
Marsolek

(10) Patent No.: US 7,984,778 B2
(45) Date of Patent: Jul. 26, 2011

(54) PACKAGING ARRANGEMENT FOR A FLUID TANK FOR A MACHINE

(75) Inventor: John Marsolek, Watertown, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 752 days.

(21) Appl. No.: 11/943,257

(22) Filed: Nov. 20, 2007

(65) Prior Publication Data

US 2009/0127889 A1 May 21, 2009

(51) Int. Cl.
*B60K 13/02* (2006.01)
*B60K 11/00* (2006.01)

(52) U.S. Cl. ............... 180/68.3; 180/68.1; 180/68.4; 180/69.2

(58) Field of Classification Search ............ 180/68.1, 180/68.3, 68.4, 69.2, 69.23, 69.24; 280/159, 280/847; 296/193.1, 193.11
See application file for complete search history.

(56) References Cited

U.S. PATENT DOCUMENTS

| | | | |
|---|---|---|---|
| 3,207,250 A * | 9/1965 | Bamford | ............... 180/68.4 |
| 3,982,600 A | 9/1976 | Gerresheim et al. | |
| 4,081,050 A | 3/1978 | Hennessey et al. | |
| 4,454,926 A * | 6/1984 | Akins | ............... 180/68.1 |
| 4,969,533 A | 11/1990 | Holm et al. | |
| 5,036,931 A * | 8/1991 | Iritani | ............... 180/68.1 |
| 5,143,516 A * | 9/1992 | Christensen | ........... 415/182.1 |
| 5,193,636 A | 3/1993 | Holm | |
| 5,269,367 A * | 12/1993 | Susa et al. | ............... 165/41 |
| 5,273,341 A * | 12/1993 | Cornille, Jr. | ........... 296/193.11 |
| 5,495,910 A * | 3/1996 | Stauffer et al. | ............ 180/69.2 |
| 5,634,525 A * | 6/1997 | Templeton et al. | ........ 180/69.24 |
| 5,794,733 A | 8/1998 | Stosel et al. | |
| 5,853,046 A * | 12/1998 | Williams et al. | ............... 165/76 |
| 6,056,075 A | 5/2000 | Kargilis | |
| 6,089,650 A | 7/2000 | Edgeller et al. | |
| 6,202,777 B1 | 3/2001 | Surridge | |
| 6,298,906 B1 * | 10/2001 | Vize | ............... 165/41 |
| 6,457,543 B1 | 10/2002 | Woolridge | |
| 6,565,148 B1 | 5/2003 | Teramoto et al. | |
| 6,589,307 B2 | 7/2003 | Jaramillo et al. | |
| 6,688,424 B1 * | 2/2004 | Nakada et al. | ............... 181/224 |
| 6,817,404 B2 | 11/2004 | Frana-Guthrie et al. | |
| 7,575,081 B2 * | 8/2009 | Obe et al. | ............... 180/68.1 |
| 2001/0007292 A1 * | 7/2001 | Yabf | ............... 180/68.1 |
| 2004/0216934 A1 * | 11/2004 | Tomiyama et al. | ......... 180/68.1 |
| 2004/0262061 A1 | 12/2004 | Bahr et al. | |
| 2006/0048986 A1 * | 3/2006 | Bracciano | ............... 180/69.2 |

FOREIGN PATENT DOCUMENTS

| | | |
|---|---|---|
| JP | 06048194 | 2/1994 |
| JP | 09193673 | 7/1997 |

* cited by examiner

*Primary Examiner* — Jeffrey J Restifo
*Assistant Examiner* — Jacob Meyer
(74) *Attorney, Agent, or Firm* — Leydig, Voit & Mayer

(57) ABSTRACT

A packaging arrangement for a fluid tank for a machine, including an engine disposed within an engine compartment of a body having a hood selectively disposed over the engine compartment. The engine includes a cooling package having at least one air intake. At least one fluid tank at least partially surrounds the air intake, and a compliant surface is coupled to at least one of the fluid tank and the hood. The compliant surface substantially seals against both the fluid tank and the hood to substantially inhibit air from within the engine compartment from being drawn into the air intake.

20 Claims, 4 Drawing Sheets

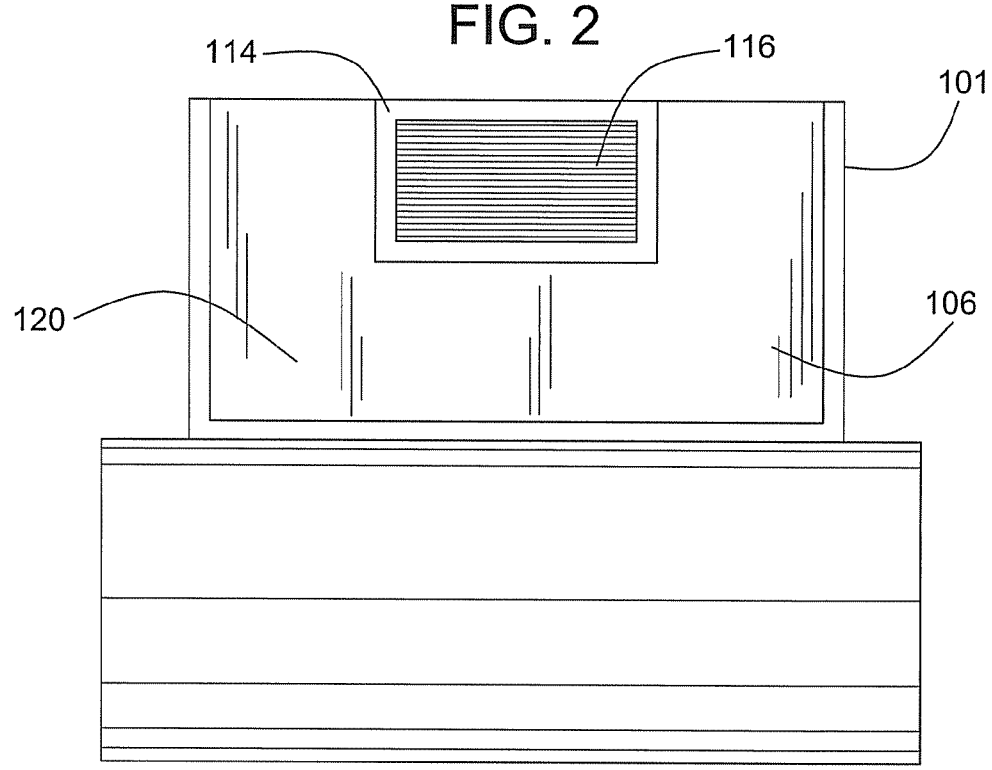
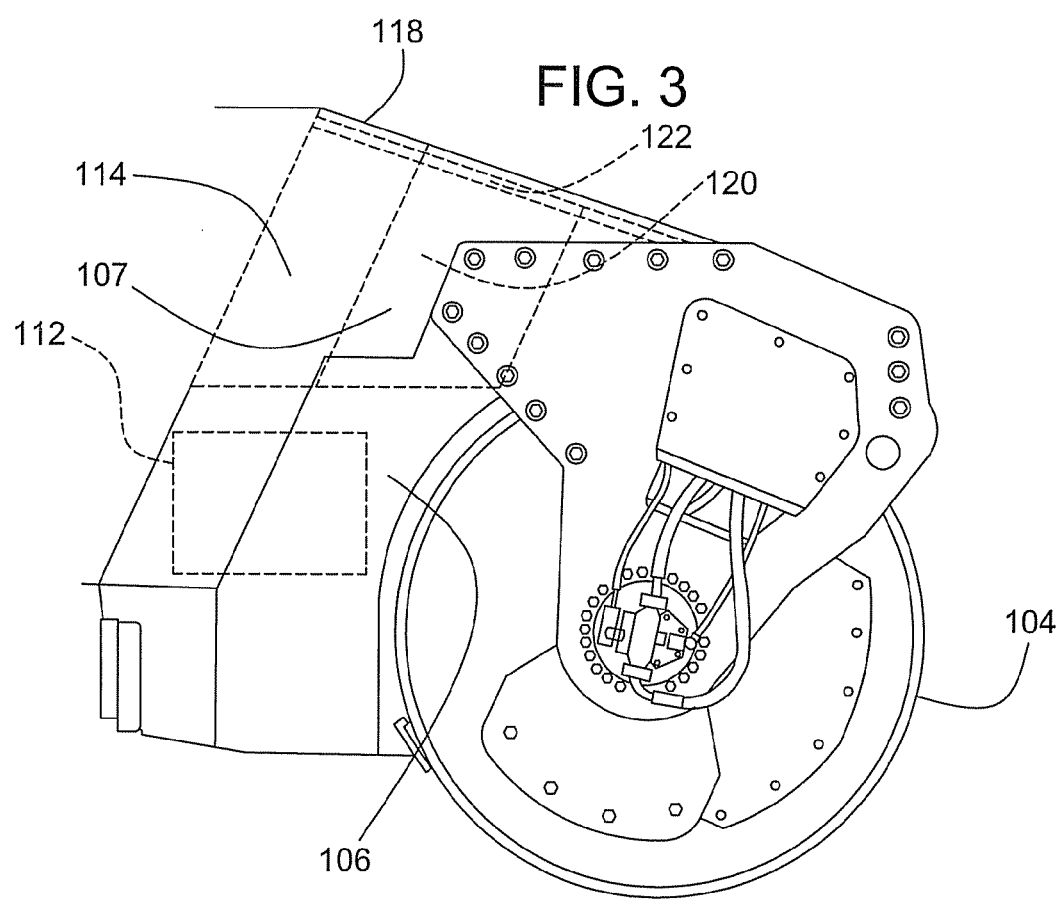

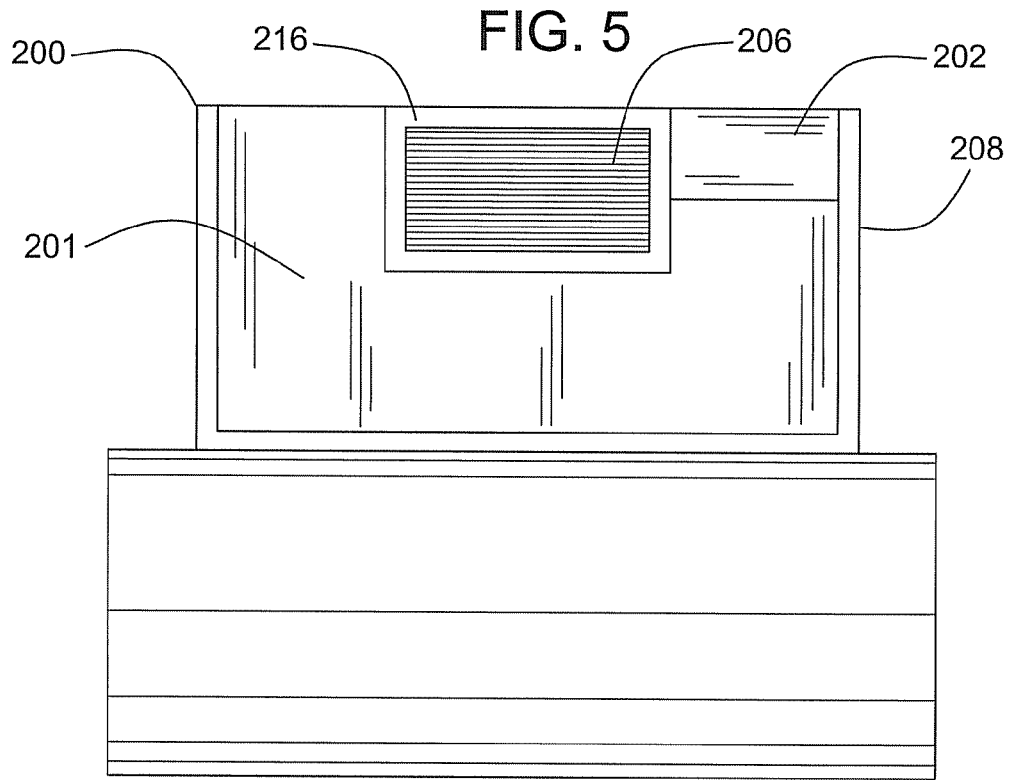
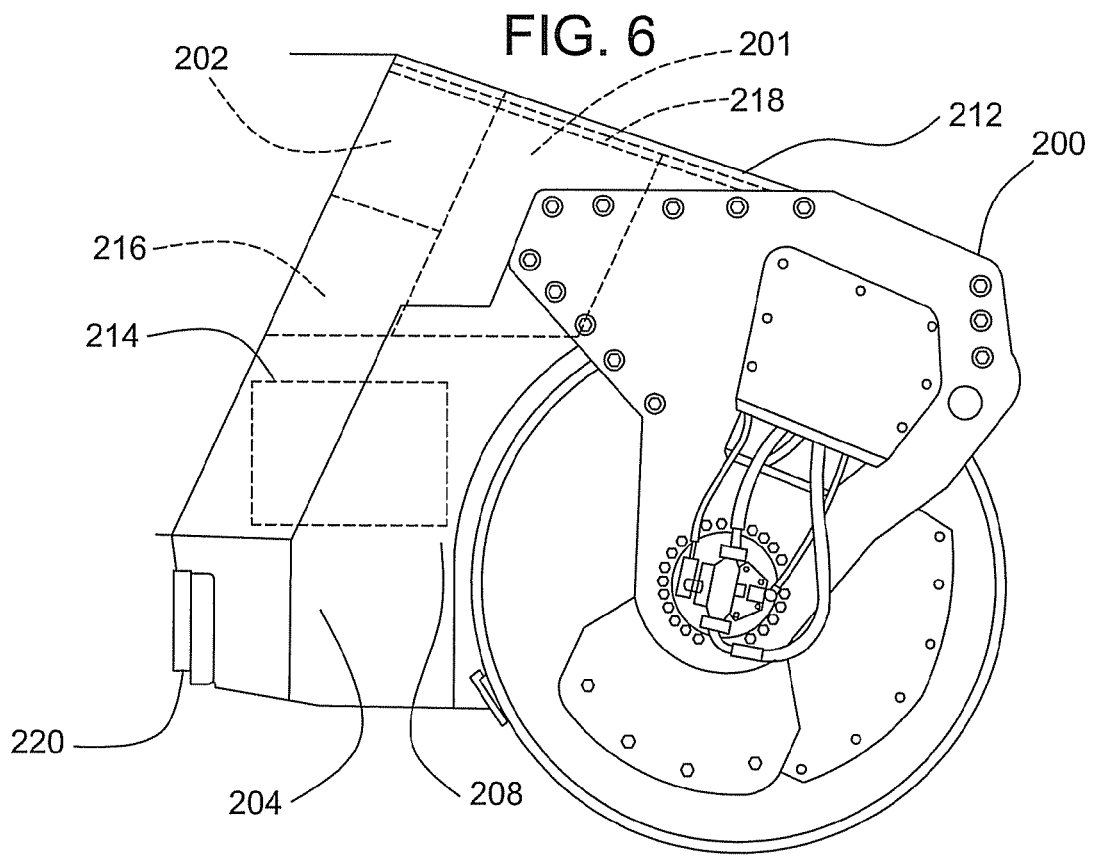

PACKAGING ARRANGEMENT FOR A FLUID TANK FOR A MACHINE

TECHNICAL FIELD

This patent disclosure relates generally to a fluid tank for a machine and, more particularly to a packaging arrangement for a fluid tank for a machine.

BACKGROUND

New environmental standards and increasing fuel costs have required that machines and vehicles function more efficiently. While enhancements to the individual systems of the machine may offer increases in the overall efficiency of machine operation, such enhancements may be insufficient to meet current needs. A machine cooling package, for example, operates less efficiently when warmer air flow is provided to the system as opposed to cooler air being provided. Warm or hot air flow often results when hot air from an engine is allowed to escape from the machine's engine compartment and enter the engine cooling package. Inasmuch as the air from the engine compartment is generally warmer than ambient air, unless the warm air from the engine is channeled away or separated from the air intake for the cooling package, the cooling package will operate less efficiently than would be the case with a cooler flow of air.

U.S. Pat. No. 5,634,525 to David J. Templeton et al. (the '525 patent) attempts to eliminate the recirculation of hot air from a machine engine compartment to a machine cooling package. The '525 patent discloses modifications to a machine hood to minimize the air gap between the machine radiator and the hood to deter the recirculation of hot air from the engine compartment back through the radiator. The arrangement of the '525 patent disclosure provides only limited improvements to cooling package efficiency, however, and further enhancements are desirable.

Any modifications to either the internal systems of a machine or the exterior of a machine ideally should not interfere with general operation of the machine, however. For example, operators of vehicles and machines must have adequate sightline to allow them to safely and efficiently operate the same. Operators of vehicles, in particular, must be able to view as much of the terrain around them as possible, not only to permit them to efficiently operate the machine, but also to ensure safe operation. In this regard, blind spots and obstructions to the operator's vision should be reduced as much as possible.

It is therefore desirable to provide machines or vehicles that operate efficiently, and, more particularly, that include efficiently operating cooling packages. The present disclosure is directed to overcoming one or more of the problems set forth above.

SUMMARY

The disclosure describes, in one aspect, discloses a machine winch has a body forming an engine compartment. The body of the machine further has a hood, winch may be selectively moved between a closed position wherein the hood substantially covers the engine compartment and an open position wherein the hood substantially does not cover the engine compartment. The machine also has an engine, which is disposed at least partially within the engine compartment. The engine includes a cooling package with at least one air intake. The machine also has at least one fluid tank at least partially disposed within the engine compartment and at least partially surrounding the air intake. The machine further has a compliant surface coupled to at least one of the fluid tank and the hood. The compliant surface substantially seals against both the fluid tank and the hood when the hood is in the closed position, and substantially inhibits air from within the engine compartment from being drawn into the air intake.

The disclosure describes, in another aspect, a vehicle with a vehicle body which forms an engine compartment, and a vehicle hood which is movable and substantially covers the engine compartment in the closed position and does not substantially cover the engine compartment in the open position. At least partially within the engine compartment is an engine which has a cooling package with at least one air intake. The engine compartment also at least partially encloses at least one fluid tank, winch at least partially surrounds the air intake. A compliant surface is coupled to at least one of the fluid tank and the hood. The compliant surface substantially seals against both the fluid tank and the hood when the hood is in the closed position, and substantially inhibits air from within the engine compartment from being drawn into the air intake.

The disclosure, in another aspect, describes a vehicle with a vehicle body which forms an engine compartment, and a vehicle hood which is movable and substantially covers the engine compartment in the closed position and does not substantially cover the engine compartment in the open position. An engine is disposed at least partially within the engine compartment. The engine includes a cooling package with at least one air intake. The hood includes an opening, and the air intake is in communication with the opening. The engine compartment also at least partially encloses two fluid tanks. The fluid tanks are nested together and form a generally U-shaped structure which surrounds the air intake at least 270°. A compliant surface is coupled to at least one of the fluid tank(s) and the hood. The compliant surface substantially seals against both the fluid tank(s) and the hood when the hood is in the closed position, and substantially inhibits air from within the engine compartment from being drawn into the air intake.

BRIEF DESCRIPTION OF THE DRAWING(S)

FIG. 2 is an enlarged fragmentary view of the machine taken along line 2-2 in FIG. 1 when the hood is disposed in an open position.

FIG. 3 is an enlarged, fragmentary side elevational view of the machine of FIG. 1.

FIG. 5 is a fragmentary view of another embodiment of machine, similar to the view shown in FIG. 2, wherein the hood is disposed in an open position.

FIG. 6 is a fragmentary, side elevational view of the machine of FIG. 5.

DETAILED DESCRIPTION

This disclosure relates to a packaging arrangement for fluid tanks within an engine compartment of a machine. The relative positioning of the fluid tank, an air intake to a machine cooling package, a hood covering the engine compartment, and the inclusion of a compliant material between the fluid tank and the hood inhibits warm air from the engine compartment from being drawn back into the intake of the cooling package.

Figure 1:
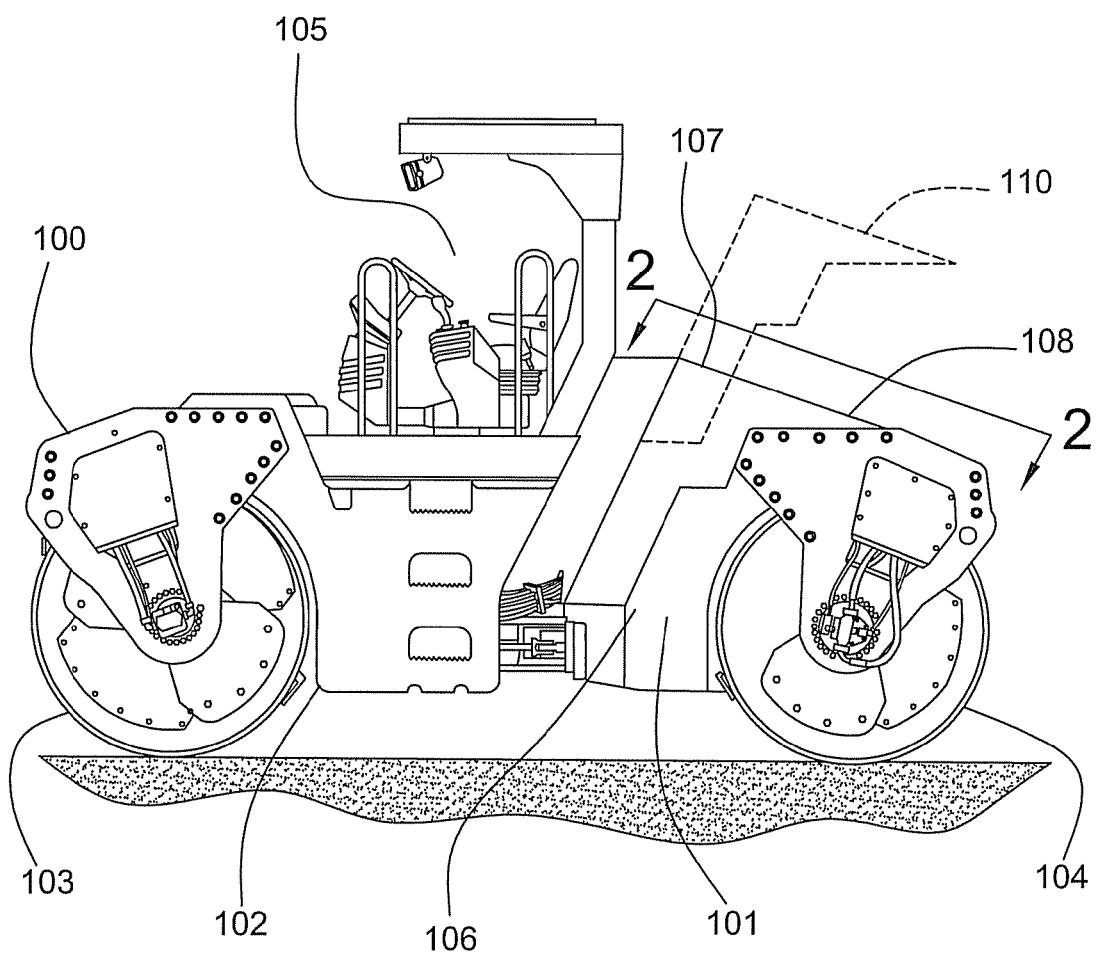
FIG. 1 is a side elevational view of an exemplary machine embodying the disclosure.

Referring to the drawings, there is shown in FIG. 1, a machine 100 with vehicle body 101 supported on a frame 102, the frame 102 being supported on a plurality of motivators, in this case, a pair of rollers 103, 104. The vehicle body 101 includes a cab 105 for supporting all operator. The vehicle body 101 forms an engine compartment 106, and includes a hood 107, adapted to selectively cover at least a portion of the engine compartment 106. The hood 107 may be disposed in a closed position 108, wherein the hood substantially covers the engine compartment (as shown, for example, in solid lines in FIG. 1), and an open position 110, wherein the hood substantially does not cover the engine compartment (as shown, for example, in phantom in FIG. 1).

Referring to FIGS. 2 and 3, an engine 112 is disposed at least partially within the engine compartment 106. The engine 112 includes a cooling package 114 with at least one air intake 116. The air intake 116 extends through an opening 118 in the hood 107, and is adapted to receive air to be circulated about the cooling package 114. The term "opening" in the hood 107 includes not only a passage with a closed perimeter, but a passage having a perimeter that is open on one or more sides, as, for example, a U-shaped structure. The cooling package 114 itself may be of any appropriate design.

Although a compactor is illustrated in FIG. 1, the embodiments described herein are provided by way of example and for illustration purposes only. Therefore, the examples set forth herein should not be construed as limiting based on the specific vehicle described in association therewith, but should be construed as applicable to any other type of machine or vehicle that includes a cooling package 114 having at least one air intake 116, and being at least partially housed within an engine compartment. Thus, the terms "machine" and "vehicle" may refer to any machine or any vehicle (the term "machine" including a vehicle) that includes such structure, including any machine that performs some type of operation associated with an industry such as mining, construction, fanning, transportation, or any other industry known in the art. For example, a machine may be any vehicle or earthmoving machine, such as a wheel loader, excavator, dump truck, backhoe, motorgrader, material handler or the like. Further, a machine may include motivators such as wheels, rollers or the like, and may include an attached implement, which may be utilized and employed for a variety of tasks, including, for example, loading, compacting, lifting, brushing, and include, for example, buckets, compactors, forked lifting devices, brushes, grapples, cutters, shears, blades, breakers/hammers, augers, and others.

Returning to the figures, the vehicle body 101 also houses at least one fluid tank 120. The fluid tank 120 may house any required fluids, such as, by way of example only, fuel, water, hydraulic fluid, oil, antifreeze, cleaning fluid, transmission fluid, or any other fluid utilized by the machine or operator. The fluid tank 120 may be formed of any appropriate material and fabricated by any appropriate process, such as a plastic fluid tank created by rotational molding.

According to the disclosure, the fluid tank 120 is at least partially disposed within the engine compartment 106, and is adapted to at least partially surround the air intake 116 and be positioned proximal to the hood 107 when the hood is disposed in the closed position 108. In the embodiment illustrated in FIGS. 2 and 3, the air intake 116 is generally centered in the lateral direction of the machine 100, and positioned toward the cab 105. Thus, in this embodiment, the fluid tank 120 is a generally U-shaped structure that opens toward the cab 105, substantially surrounding the air intake 116. The fluid tank 120 may be further adapted to surround additional structures, including, for example, additional components of the cooling package 114. At least a portion of the fluid tank 120 surrounding the air intake 116 in any event is additionally disposed proximal to the hood 107.

In order to minimize the opportunity for air from within the engine compartment 106 to flow into the air intake 116, a compliant surface 122 is disposed between the proximally disposed surfaces of the hood 107 and the fluid tank 120 at least partially surrounding the air intake 116. In this way, the compliant surface 122 is adapted to substantially seal against both the fluid tank 120 and the hood 107 when the hood 107 is in the closed position 108. Thus, the combination of the compliant surface 122 with the hood 107 and the fluid tank 120 substantially inhibits air from within the engine compartment 106 from being drawn into the air intake 116 of the cooling package 114. As a result, the air intake 116 draws air from the atmosphere surrounding the machine 100, rather than from within the engine compartment 106.

While the compliant surface 122 may be in the form of a blanket laid between the surfaces of the hood 107 and the fluid tank 120, the compliant surface 122 may alternately be one or more strips of compliant material that are disposed generally about the air intake 116 when the hood 107 is in a closed position 108. The compliant surface 122 is formed of any appropriate material that may conform to an adjacent surface and can withstand the environmental elements in its disposition in the engine compartment 106. By way of example only, the complaint surface 122 may be formed of materials such as polymeric, rubberized, or silicone materials, although materials may be utilized.

Figure 4:
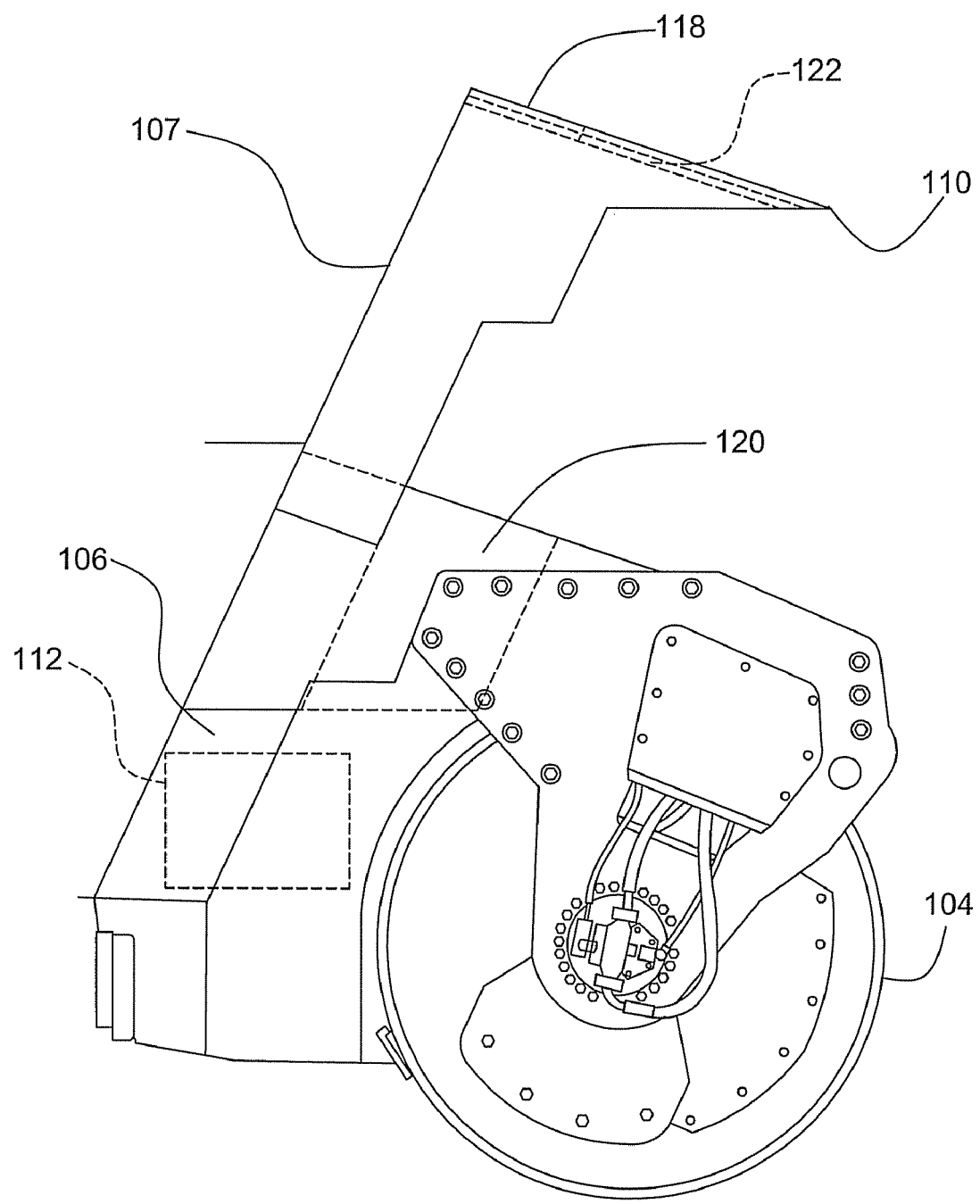
FIG. 4 is an enlarged, fragmentary side elevational view of the machine similar to FIG. 3, only with the hood in an open position.

The compliant surface 122 may conveniently be coupled either to the hood 107 or to the fluid tank 120. Referring to FIG. 4, the hood 107 is shown in the open position 110 and the compliant surface 122 is shown coupled to the hood 107. Alternately, the compliant surface 122 may be provided in two or more parts, which individual parts may be coupled to the hood 107 or the fluid tank 120.

Moreover, a plurality of fluid tanks may be provided. In such arrangements, a single one of the tanks may substantially surround the air intake 116 or a combination of the tanks may be disposed to together substantially surround the air intake 116.

Referring now to FIGS. 5 and 6, there is shown another embodiment of a machine 200, wherein there are two fluid tanks 201, 202 disposed within the engine compartment 204 to at least partially surround an air intake 206. As with the machine 100 of FIG. 1, the machine 200 includes a vehicle body 208 forming the engine compartment 204 at least partially covered by a hood 212. An engine 214 at least partially housed within the engine compartment 204 includes a cooling package 216 having the air intake 206 extending through the hood 212.

A compliant surface 218 is coupled to the hood 212 and/or to the fluid tanks 201, 202. As with the first embodiment, the compliant surface substantially seals against both the fluid tanks 201, 202 and the hood 212 when the hood 212 is in the closed position to substantially inhibit air from within the engine compartment 204 from being drawn into the air intake 206.

In this embodiment, the two fluid talks 201, 202 are shaped such that they may be nested together. The fluid tanks 201, 202 may be rigidly connected together by any means or the tanks may simply nest together without a rigid connection. While embodiments of only one and of two fluid tanks are specifically illustrated herein, alternate embodiments may include three, four, or more fluid tanks, acting alone or in concert to substantially surround the air intake 116, 206.

Further, while the fluid tanks 120, 201, 202 are illustrated as having a generally U-shaped configuration, surrounding the air intake 116, 206 approximately 270° about its perimeter, the fluid tank(s) may be formed to provide substantially any structure as required by the geometry and respective locations of the air intake 116, 206, the remainder of the cooling package 114, 216, the hood 107, 212, the engine compartment 106, 204, and other components of the engine 112, 214 and the machine 100, 200. By way of example only, one or more fluid tanks may be formed in a generally O-shaped configuration, completely surrounding an air intake on all sides in a plane. Other configurations likewise fall within the scope of this disclosure. Further, the fluid tank 120, 201, 202 may be rigidly secured to the frame 102, 220, removably coupled to the frame 102, 220, or the relative geometries of the fluid tank 120, 201, 202, the air intake 116, 206, the cooling package 114, 216 the engine compartment 106, 204, other engine components, the hood 107, 212 and/or the vehicle body 101, 208 may be such that the fluid tank 120, 201, 202 is maintained in position without rigidly securing the same.

INDUSTRIAL APPLICABILITY

The disclosed arrangements may be useful in a variety of machines, and in motor vehicles, in particular, to provide more efficient operation by inhibiting the flow of air from the engine compartment into the cooling package. The shape and disposition of the fluid tank(s) relative to the air intake and the hood may reduce pathways for air to enter or exit the engine compartment when the machine hood is in the closed position as the compliant material seals against the surfaces of the hood and the tank(s).

Further, some embodiments of the arrangement may provide more space efficient packaging of the components of the vehicle, such as the engine, the cooling package, and necessary fluid tank(s). Some embodiments of the arrangement may allow for the overall size of the engine compartment to be reduced because the fluid tank may be made in a shape which maximizes storage capacity without enlarging the size of the engine compartment. Thus, some embodiments may be particularly useful in vehicles where it is desirable to reduce or minimize the overall size of the engine compartment.

This reduced engine compartment size may minimize blind spots and viewing obstructions for the operator, enhancing the operator's view of the areas surrounding the machine. As a result, some embodiments may be particularly useful in machines where an operator's view of the machine itself and the areas surrounding the machine are very important, such as asphalt or soil compaction vehicles.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A machine comprising:
   a body forming an engine compartment, the body further including a hood, said hood being adapted to be selectively moved between a closed position wherein the hood substantially covers the engine compartment and an open position wherein the hood substantially does not cover the engine compartment,
   an engine disposed at least partially within said engine compartment, said engine including a cooling package having at least one air intake,
   at least one fluid tank at least partially disposed within said engine compartment, the cooling package not including the fluid tank, said fluid tank at least partially surrounding the air intake, and
   a compliant surface coupled to at least one of said fluid tank and said hood, said compliant surface substantially sealing against both the fluid tank and the hood when the hood is in the closed position, said compliant surface substantially inhibiting air from within the engine compartment from being drawn into the air intake.

2. The machine of claim 1 wherein the hood includes an opening, and the air intake is at least partially in communication with the opening.

3. The machine of claim 1 wherein the at least one fluid tank is adapted to contain at least one of a fuel, water, hydraulic fluid, oil, antifreeze, cleaning fluid, and transmission fluid.

4. The machine of claim 1 wherein the fluid tank substantially surrounds the air intake by 270°.

5. The machine of claim 1 wherein the at least one fluid tank includes at least two fluid tanks.

6. The machine of claim 5 wherein the at least two fluid tanks are nested together, the nested tanks surrounding a portion of a perimeter of the air intake.

7. The machine of claim 1 wherein the compliant surface includes at least a first portion that is coupled to the hood, and a second portion that is coupled to the at least one fluid tank.

8. A vehicle comprising:
   a vehicle body forming an engine compartment, the body further including a hood, said hood being adapted to be selectively moved between a closed position wherein the hood substantially covers the engine compartment and an open position wherein the hood substantially does not cover the engine compartment,
   an engine disposed at least partially within said engine compartment, said engine including a cooling package having at least one air intake,
   at least one fluid tank at least partially disposed within said engine compartment, the cooling package not including the fluid tank, said fluid tank at least partially surrounding the air intake, and
   a compliant surface coupled to at least one of said fluid tank and said hood, said compliant surface substantially sealing against both the fluid tank and the hood when the hood is in the closed position, said compliant surface substantially inhibiting air from within the engine compartment from being drawn into the air intake.

9. The vehicle of claim 8 wherein the hood includes an opening, and the air intake is at least partially in communication with the opening.

10. The vehicle of claim 8 wherein the at least one fluid tank is adapted to contain at least one of a fuel, water, hydraulic fluid, oil, antifreeze, cleaning fluid, and transmission fluid.

11. The vehicle of claim 8 wherein the fluid tank substantially surrounds the air intake by 270°.

12. The vehicle of claim 11 wherein the fluid tank substantially surrounds an entire perimeter of the air intake.

13. The vehicle of claim 8 wherein the at least one fluid tank includes at least two fluid tanks.

14. The vehicle of claim 13 wherein the fluid tanks are nested together.

15. The vehicle of claim 8 wherein the at least one fluid tank is rigidly connected to the vehicle frame.

16. The vehicle of claim 8 wherein the at least one fluid tank is not rigidly connected to the vehicle frame.

17. The vehicle of claim 8 wherein the compliant surface is coupled to the vehicle hood.

18. The vehicle of claim 8 wherein the compliant surface is coupled to the at least one fluid tank.

19. The vehicle of claim 8 wherein the compliant surface includes at least a first portion that is coupled to the hood, and a second portion that is coupled to the at least one fluid tank.

20. A vehicle comprising:
a vehicle body forming an engine compartment, the body further including a hood, said hood being adapted to be selectively moved between a closed position wherein the hood substantially covers the engine compartment and an open position wherein the hood substantially does not cover the engine compartment, said hood including an opening,
an engine disposed at least partially within said engine compartment, said engine including a cooling package having at least one air intake, said air intake being disposed to communicate with said opening,
at least two fluid tanks at least partially disposed within said engine compartment, the cooling package not including the fluid tanks, said fluid tanks being nested together and forming a generally U-shaped structure, the U-shaped structure surrounding the air intake at least 270°, and
a compliant surface coupled to at least one of said fluid tanks and said hood, said compliant surface substantially sealing against both the fluid tanks and the hood when the hood is in the closed position, said compliant surface substantially inhibiting air from within the engine compartment from being drawn into the air intake.

* * * * *